(12) United States Patent
Rosenlöf

(10) Patent No.: US 11,679,581 B2
(45) Date of Patent: Jun. 20, 2023

(54) PACKAGING MATERIAL COMPRISING MAGNETIZED PORTIONS AND METHOD FOR MAGNETIZING THE MATERIAL

(71) Applicant: Tetra Laval Holdings & Finance S.A., Pully (CH)

(72) Inventor: Torbjörn Rosenlöf, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 918 days.

(21) Appl. No.: 16/322,909

(22) PCT Filed: Jul. 12, 2017

(86) PCT No.: PCT/EP2017/067501
§ 371 (c)(1),
(2) Date: Feb. 1, 2019

(87) PCT Pub. No.: WO2018/024453
PCT Pub. Date: Feb. 8, 2018

(65) Prior Publication Data
US 2019/0168498 A1    Jun. 6, 2019

(30) Foreign Application Priority Data
Aug. 3, 2016 (EP) ..................... 16182640

(51) Int. Cl.
*B32B 38/00* (2006.01)
*B32B 37/00* (2006.01)
(Continued)

(52) U.S. Cl.
CPC .......... *B32B 38/145* (2013.01); *B31B 50/006* (2017.08); *B31B 50/88* (2017.08);
(Continued)

(58) Field of Classification Search
CPC ... B31B 50/006; B31B 50/88; B32B 37/0053; B32B 2307/208; B32B 2439/70
See application file for complete search history.

(56) References Cited

U.S. PATENT DOCUMENTS 5,458,062 A * 10/1995 Goldberg ............. B65H 23/046
101/226
6,352,497 B1   3/2002 Hensley et al.
(Continued)

FOREIGN PATENT DOCUMENTS

EP    0977015    * 2/2000
JP    4869682 62    2/2012
(Continued)

OTHER PUBLICATIONS

"Introduction to Packaging Engineering Machinery", Hunan University Press, LEI, Fuyuan, pp. 29-30, Dec. 1989.
(Continued)

*Primary Examiner* — Matthew G Marini
*Assistant Examiner* — Marissa Ferguson-Samreth
(74) *Attorney, Agent, or Firm* — Knobbe, Martens, Olson & Bear, LLP

(57) ABSTRACT

A device for magnetizing a packaging material for food-containing packages is disclosed. The device can include a feeder for feeding a packaging material through the device, the packaging material having a plurality of portions of magnetisable ink. The device can also include a static bar having at least one magnet for magnetizing the portions of ink applied to the packaging material. The device can also include a magnetizable ink applicator for applying the plurality of portions of magnetizable ink to the packaging material. The packaging material can be a non-creased packaging material. A system for producing a packaging material is also disclosed. A method of magnetizing a packaging material for a food-containing package is further disclosed.

17 Claims, 4 Drawing Sheets

(51) Int. Cl.
  *B32B 37/15* (2006.01)
  *B65B 61/02* (2006.01)
  *B65B 9/20* (2012.01)
  *B31B 50/88* (2017.01)
  *B31B 50/00* (2017.01)

(52) U.S. Cl.
  CPC ........ B32B 37/0053 (2013.01); B32B 37/153 (2013.01); B65B 9/20 (2013.01); B65B 61/025 (2013.01); *B32B 2307/208* (2013.01); *B32B 2439/70* (2013.01)

(56) References Cited

U.S. PATENT DOCUMENTS

| | | | |
|---|---|---|---|
| 2008/0057245 A1 | 3/2008 | Bennett et al. | |
| 2012/0076995 A1* | 3/2012 | Nilsson | B32B 15/12 428/195.1 |
| 2013/0057930 A1* | 3/2013 | Toki | B26D 9/00 358/488 |
| 2013/0228614 A1* | 9/2013 | Bergholtz | B31B 50/006 229/100 |
| 2016/0016390 A1* | 1/2016 | Lundblad | E04F 15/105 428/329 |

FOREIGN PATENT DOCUMENTS

| RU | 2314205 | 1/2008 |
|---|---|---|
| RU | 2533289 | 11/2014 |

OTHER PUBLICATIONS

Search Report and Written Opinion received in International Application PCT/EP2017/067501 dated Feb. 8, 2018.
European Office Action dated Jul. 22, 2019 issued in corresponding EP Application No. 17180856.1.

* cited by examiner

PACKAGING MATERIAL COMPRISING MAGNETIZED PORTIONS AND METHOD FOR MAGNETIZING THE MATERIAL

TECHNICAL FIELD

The present invention relates to a packaging material comprising at least one detectable information-carrying mark per packaging container intended to be formed from the material. More particularly, the invention relates to a packaging material with a plurality of magnetized ink portions, a device for magnetizing a packaging material, a system for producing a packaging material, and a method of magnetizing a packaging material.

BACKGROUND

Many pourable food products, such as fruit juice, UHT (ultra-high-temperature treated) milk, wine, tomato sauce, etc., are sold in packages made of sterilized packaging material. The packaging material may be supplied as individual sheets or blanks cut from a web before filling with a food product or as a web to be formed into a tube during the process of filling, sealing and forming a package.

Optical guiding marks have been provided on the individual sheet or web to carry operation-related information to guide operations when the packaging material is folded and sealed into a package. The optical mark is provided during printing of the sheet or web where decoration or product information is printed. Optical marks undesirably consume a significant area of what becomes the exterior of the package. Attempts have been made to reduce such undesirably consumed exterior surface by reducing the physical size of the mark. However, reducing the physical size is restricted to a lower critical limit below which the mark is too small to be detectable with at least a minimum of required accuracy by means of available optical equipment.

The development of packaging materials with magnetic marks overcame the aforementioned problems of optical marks.

WO 2012/072309 discloses a packaging material comprising at least one detectable magnetizable portion per package. The portion may be printed on the side of the sheet or web intended to face the interior of the package i.e. away from a consumer. Once magnetized the portion provides a magnetic mark carrying a magnetic field pattern aligned with a preparation feature for enhancing the formation and finishing of packages. Preparation features include crease lines, openings, or exterior printing of the package.

The magnetizable portion may be produced during an early phase of the packaging material production process. Alternatively, the magnetism may be applied to the portion at the same time the preparation feature is formed thereby ensuring the alignment of the magnetic mark with operation of the preparation feature. For instance, in a creased sheet or web the magnetic marks attain their magnetism via magnets in the creasing roller. The magnets may be placed on the periphery of the creasing roller as disclosed in WO 2016/045994. The magnets apply a magnetic field to a magnetizable portion on the sheet (or web) as the sheet passes the creasing roller to form the creases.

Sometimes a non-creased web or sheet is used to form a pillow-type package such as Tetra Fino Aseptic® (TFA) provided by the present applicant. A creasing roller or tool is not used or required during formation of packages from non-creased sheets. Further, use of:

(i) a pseudo-creasing roller having magnets only with no creasing ability; or (ii) a separate roller with magnets synchronized with printing of the magnetic ink onto the sheet;

to magnetize a magnetizable portion in a non-creased packaging material are both expensive and difficult to handle and install.

Hence, there is a need for alternative methods and devices for applying magnetism to magnetizable portions on non-creased packaging materials.

SUMMARY OF THE INVENTION

According to a first aspect of the present invention, there is provided a device for magnetizing a packaging material for food-containing packages, the device comprising:

a feeder for feeding a packaging material through the device, the packaging material having a plurality of portions of magnetisable ink; and a static bar having at least one magnet for magnetizing the portions of ink applied to the packaging material.

In some embodiments of the first aspect the device is a printing press. In other embodiments of the first aspect of the invention the device is a filling machine.

According to a second aspect of the present invention, there is provided a system for producing a packaging material, the system comprising:

a device as claimed in any one of the preceding claims for magnetizing the packaging material; and at least one lamination station comprising an extruder and a roller press nip for providing a lamination layer to laminate the magnetized packaging material.

According to a third aspect of the present invention, there is provided a method of magnetizing a packaging material for a food-containing package, the method comprising:

applying a plurality of portions of magnetizable ink to the packaging material; and moving the packaging material with the applied ink portions past a plurality of static magnets to magnetize the ink portions and form the magnetized packaging material.

According to a fourth aspect of the present invention, there is provided a packaging material for producing a sealed package of a food product, the packaging material comprising:

a base layer for imparting stiffness to the packaging material;

at least one rectangular portion of magnetizable ink applied to the base layer; and at least one lamination layer applied to and covering the base layer and portion of magnetizable ink;

wherein the length of the shorter side of the rectangular magnetizable ink portion is between about 2 mm to 6 mm, preferably about 3 mm to 5 mm, and more preferably about 3.9 mm to 4.1 mm; and wherein the length of the longer side of the rectangular magnetizable ink portion is between about 7 mm to 13 mm, preferably about 8 mm to 12 mm, and more preferably about 9 mm to 11 mm.

In some embodiments of the fourth aspect the length of the shorter side of the rectangular magnetizable ink portion is about 4 mm. In a preferred embodiment the shorter side of the rectangular magnetizable ink portion as applied to the base layer is oriented to be parallel with the direction of travel of the packaging material. In some embodiments of the fourth aspect the at least one rectangular portion of magnetizable ink has dimensions of about 4 mm×10 mm.

BRIEF DESCRIPTION OF THE DRAWINGS

Some preferred, non-limiting embodiments of the present invention will be described by way of example with reference to the accompanying drawings, in which.

DETAILED DESCRIPTION OF PREFERRED EMBODIMENTS

Figure 1:
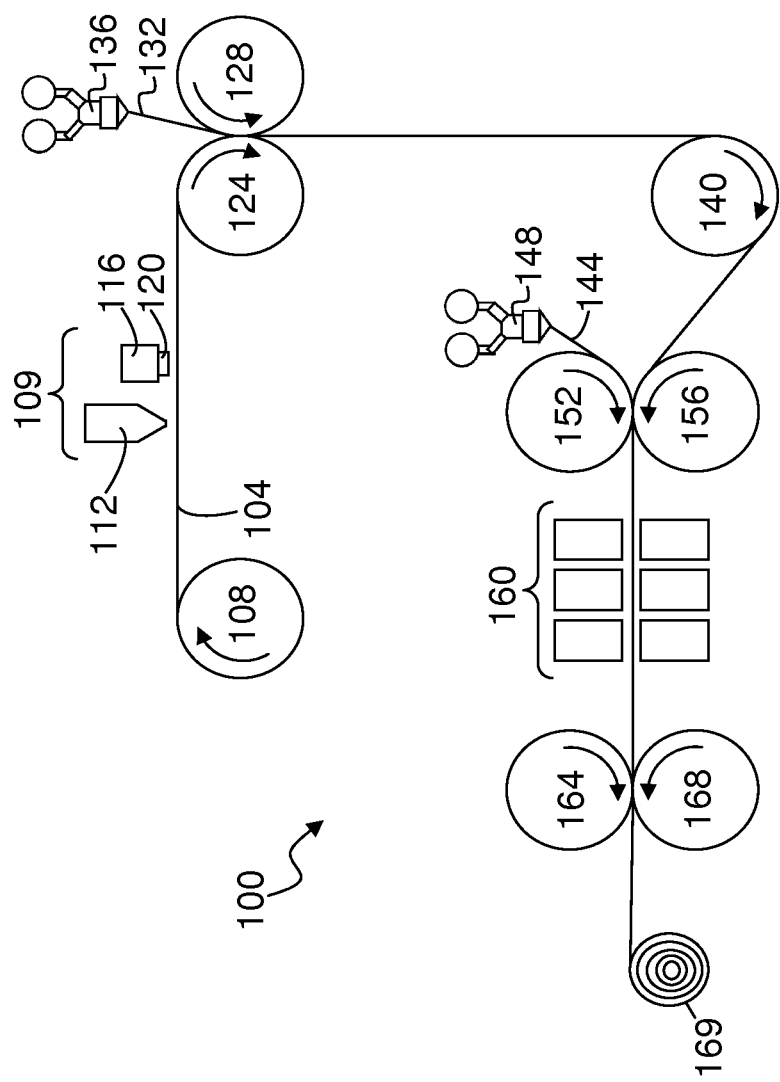
FIG. 1 illustrates a system for producing a packaging material in accordance with an embodiment of the present invention.

FIG. 1 illustrates a system 100 for producing a packaging material 104. In system 100 a reel 108 provides a base layer of packaging material 104, e.g. paper for stiffness. The base layer from reel 108 passes magnetic ink printing press 109. Printing press 109 comprises a magnetizable ink applicator 112 and a static bar 116 having a magnet 120. Although not shown, the bar 116 may have a plurality of magnets 120. As the base layer passes applicator 112 one or more portions of magnetizable ink (not shown) are applied to the surface of the base layer. The applied portion(s) then pass by the magnet 120 to magnetize the portion thereby providing one or more magnetic field marks on the base layer. Each portion may provide its own unique magnetic field pattern that is different from another portion on base layer 104. However, it is preferred that each portion provides the same magnetic field pattern. The printing press 109 will be described in more detail below with respect to FIGS. 3A, 3B, and 3C.

Figure 2A:
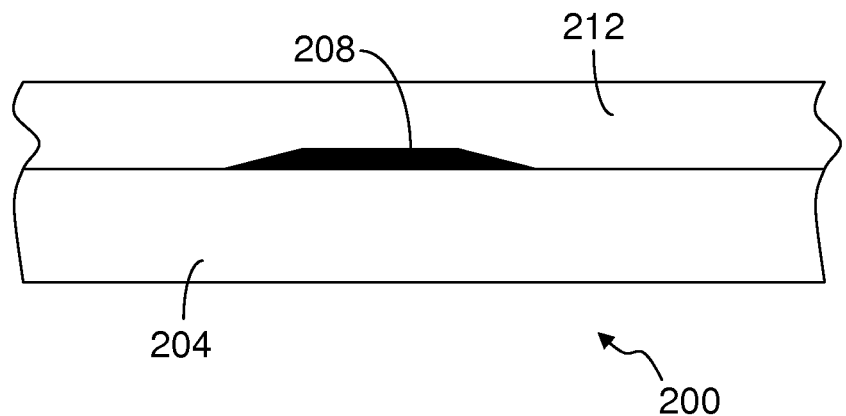
FIG. 2A is a cross-sectional side view of the packaging material that is formed during operation of the system in FIG. 1.

The packaging material 104 with one or more magnetized ink portions from printing press 109 then passes between rollers 124 and 128. At the same time a lamination layer 132 from extruder 136 is applied to the material 104 over the one or more magnetized ink portions. Immediately after passage through the rollers 124 and 128 the packaging material 104 has a multilayer structure as shown in FIG. 2A. The packaging material 200 in FIG. 2A has a base layer 204 and a magnetized ink portion 208. A lamination layer 212 covers the base layer 204 and ink portion 208. The lamination layer 212 may be a heat-seal plastic material, for example comprising a strong, high-stretch, metallocene-catalyzed, low-linear-density (LLD) polyethylene. Preferably layer 212 is laminated on the base layer in a melted state by extrusion coating prior to cooling. Although not illustrated in FIGS. 1 and 2A it is also possible to apply a layer of oxygen-barrier material, e.g. an aluminum foil, onto lamination layer 212. This oxygen barrier layer may in turn be covered by another lamination layer of heat-seal plastic material that will form the innermost layer in contact with the food product after the package is formed. Thus, in packaging material 200 as shown in FIG. 2A the ink portion 208 is applied to the surface of base layer 204 that will face the inside or interior of the package that is inevitably formed from packaging material 200. In an alternative embodiment, the ink portion 208 is applied to the surface of the base layer 204 that will face the outside or exterior of the package that is inevitably formed from the packaging material. In this alternative embodiment the ink portion 208 is then covered by a heat sealable layer of a thermoplastic polymer, such as polyolefin polymers, such as polyethylene or polypropylene, such as a low density polyethylene (LDPE), a linear low density polyethylene (LLDPE), an LLDPE polymerised in the presence of a constrained geometry catalyst such as a metallocene-catalyst (m-LLDPE), or a high-density polyethylene (HDPE) or a polypropylene homo- or copolymer, or a polymer blend comprising any of these polymers.

The shape and area of the magnetized ink portion 208 is not particularly limited. For example, the shape of an ink portion(s) 208 may be selected from the group consisting of rectangular, square, circular, oval, elongated shapes, and combinations thereof. The area of a portion 208 will usually be less than 250 mm$^2$, preferably less than 150 mm$^2$, and more preferably less than 25 mm$^2$. In some embodiments the ink portion(s) 208 are rectangular. When the ink portion(s) 208 are rectangular, it is preferred that the shorter side of the rectangle has a length of between about 2 mm to 6 mm, preferably about 3 mm to 5 mm, and more preferably about 3.9 mm to 4.1 mm. The longer side of the rectangle has a length of between about 7 mm to 13 mm, preferably about 8 mm to 12 mm, and more preferably about 9 mm to mm. Most preferred dimensions of rectangular ink portion(s) 208 are 4 mm×10 mm. The present inventors have surprisingly found that rectangular-shaped ink portions emanate a magnetic profile or signal that is easy to detect and measure. Another benefit is that the magnetic profile is detectable by existing readers thereby avoiding the need for costly new reading equipment.

The magnetizable ink comprises magnetizable particles, a solvent and a binder. The magnetizable particles may be magnetite or maghemite or hematite. The binder may be selected from the group consisting of acrylate, acrylics such as styrene acrylic copolymer, polyurethane, nitrocellulose, polyamide and latex. Two binders may be selected from this group wherein one binder serves as a dispersant such that the magnetizable particles are evenly dispersed in the ink and the other binder serves as an adhesive to the packaging material. The amount of binder may be between 15 and 70 percent by weight of the ink, preferably between 15 and 60 percent, preferably between 20 and 55 percent. The ink may further comprise additives such as waxes and/or an antifoaming agent. The waxes may be selected from the group consisting of polyethylene, polypropylene, silicone, polyamide, ethylene vinyl acetate, ethylene butyl acetate, ethylene acrylic acid and polytetrafluoro ethylene. The antifoaming agent may comprise silicone or mineral oil. The solvent may be selected from the group comprising ethanol, ethylic acetate, water, isopropanol, glycol, or a retarder solvent. The amount of magnetizable particles may be between 15 and 40 percent by weight of the ink, preferably 30-35 percent by weight. The size of the magnetizable particles may be between 0.1 and 2.5 μm, preferably between 0.1 and 0.8 μm or preferably between 0.4 and 1.5 μm, preferably about 0.3 μm or 1 μm.

Figure 2B:
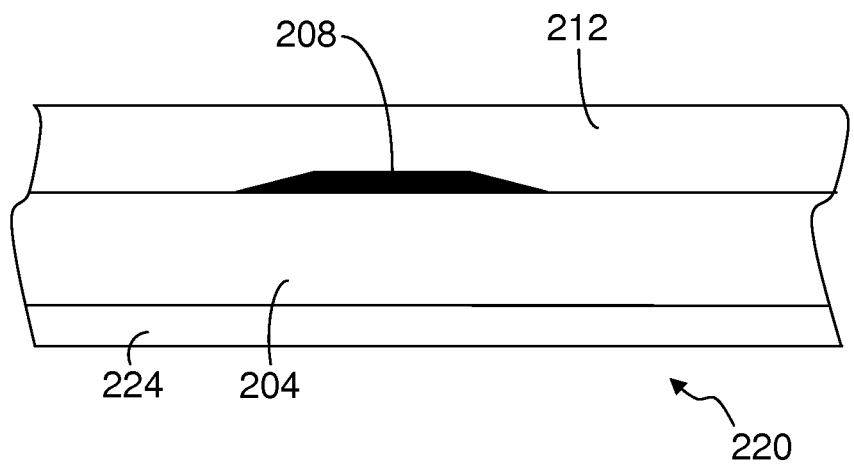
FIG. 2B shows the packaging material in FIG. 2A with an additional layer applied thereto.

Referring again to FIG. 1, the packaging material 104 then passes around another roller 140 before passing between rollers 152 and 156. A lamination layer 144 from extruder 148 is also applied to the packaging material 104 as the material 104 passes between rollers 152 and 156. Layer 144 is applied to the face of the material 104 opposing layer 132. The packaging material 104 has the multilayer structure shown in FIG. 2B after passage through rollers 152 and 156. The packaging material 220 shown in FIG. 2B has a base layer 204, magnetized ink portion 208, and lamination layer 212 as described above in FIG. 2A. A lamination layer 224 covers the face of the base layer 204 opposing lamination layer 212. The lamination layer 224 may be a heat-seal plastic material as described above with respect to lamination layer 212.

One or more operation units 160 are provided in system 100 after the packaging material 104 passes between rollers 152 and 156 for modifying the magnetized and laminated packaging material 220. Examples of operations performed by unit(s) 160 include doctoring of the packaging material or printing of decorative artwork onto the packaging material 220. It is however not essential to include an operation unit 160 in system 100.

After operation unit(s) 160 and passage between rollers 164 and 168, the packaging material is wound onto a reel 169 for later use such as with the filling machine 170 described in FIG. 4 below.

Although not shown in FIG. 1, an additional extruder may be incorporated into system 100 between operation unit(s) 160 and nip rollers 164 and 168. This additional extruder is used to extrusion coat an outermost lamination layer on top of the printed décor pattern and the printed magnetic mark of the packaging material 104.

Figure 3A:
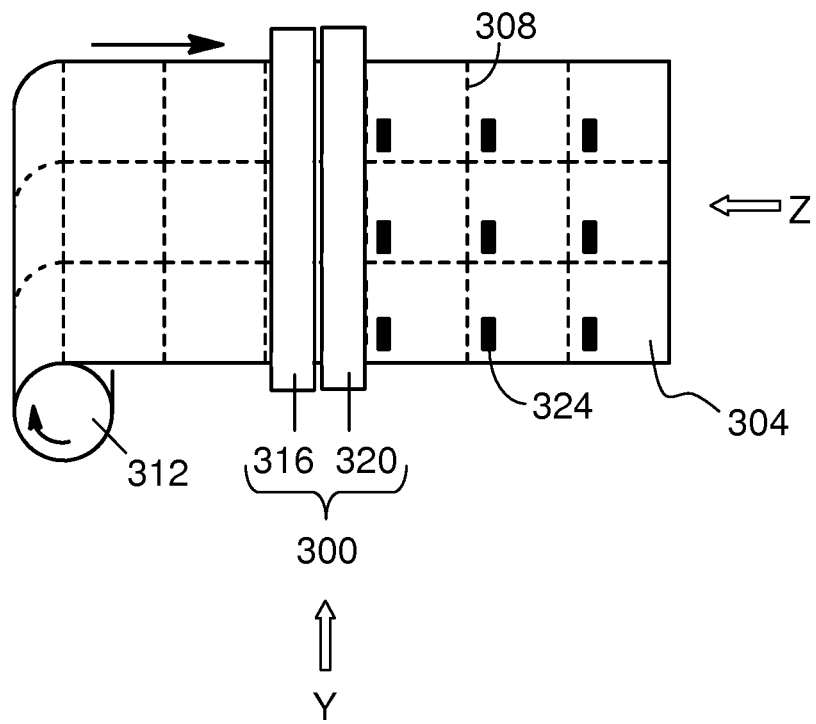
FIG. 3A is a top and partial perspective view of a printing press for applying magnetic ink to a web of packaging material and magnetizing the applied ink according to one embodiment of the invention.
Figure 3B:
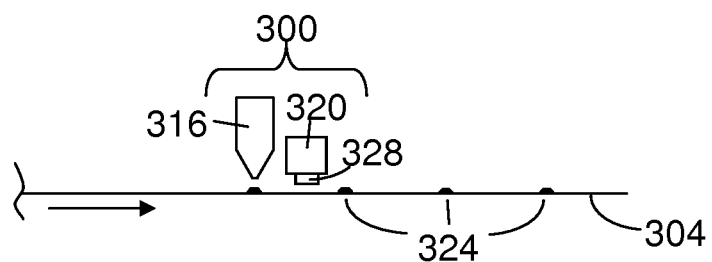
FIG. 3B is a front view of the printing press in FIG. 3A from position Y (the reel feeding the packaging material has been omitted for clarity)
Figure 3C:
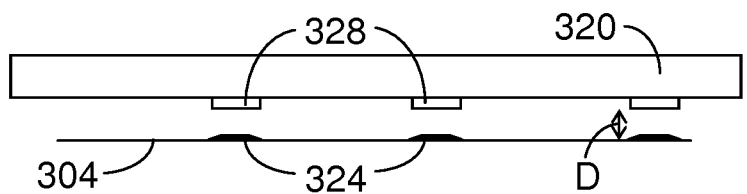
FIG. 3C is a side view of the printing press in FIG. 3A from position Z (the magnetizable ink applicator and the reel feeding the packaging material have been omitted for clarity)

FIGS. 3A, 3B, and 3C illustrate a magnetic ink printing press 300 and its use in applying and magnetizing portions of ink 324 onto a packaging material 304. The printing press 300 comprises a magnetizable ink applicator 316 and a static bar 320 having a plurality of magnets 328. Magnets 328 may be electromagnets or permanent magnets e.g. bar magnets. The magnets 328 may be on the surface of the bar 320 or may instead be accommodated in the interior of the bar 320 such as in a recess on the bar 320. Bar 320 is located adjacent to applicator 316 as shown in FIGS. 3A and 3B. However, the distance between bar 320 and applicator 316 is not particularly important. For example, bar 320 may abut applicator 316 or bar 320 may be separated from applicator 316 by about 1000 mm, 500 mm, 200 mm, 100 mm, 50 mm, 25 mm, 10 mm, or 5 mm. Bar 320 is further positioned in order that the magnets 328 are as close as possible to the packaging material 304. Preferably the distance "D" in FIG. 3C between the magnets 328 and the material 304 is about 2 mm or about 1 mm or less than 1 mm. This results in magnetization of the ink portions 324 when the material 304 is moving past and close to the bar 320.

The dashed lines 308 in FIG. 3A define the individual packaging containers to be formed. Each packaging container has a magnetised ink portion 324. Although the magnetized ink portions 324 in FIG. 3A are rectangular-shaped, the ink portions 324 may also be square-shaped or of any other suitable shape. Preferably the ink portions 324 are rectangular-shaped. More preferably, the rectangular ink portions 324 are about 4 mm×10 mm in size with the shorter 4 mm side of the rectangle oriented to be parallel with the direction of travel of the packaging material 304 as shown by the solid arrows in FIG. 3A.

The printing press 300 is used as follows. Packaging material 304, or rather a base layer later forming part of a packaging material, is fed from a reel 312 towards the printing press 300 as shown by the solid arrows in FIGS. 3A and 3B. As the packaging material or base layer 304 passes under applicator 316, magnetizable ink portions 324 are applied to the material 304. The applied portions 324 then pass by the magnets 328 on static bar 320 to magnetize the portions 324 thereby providing one or more magnetic field marks on the packaging material or base layer 304. The packaging material 304 then undergoes further processing in the system 100 illustrated in FIG. 1 or undergoes alternative operations prior to filling and forming of packages.

Without wishing to be bound by theory, it is believed the field radiating from the magnetized ink portions 324 attained after the printing press 300 will not resemble that of other magnetized marks made with existing methods involving for example, a creasing roller, wherein the size and area of the magnetizable ink portion is larger than the geometric size of the magnetic field mark i.e. the part of the ink portion that carries magnetism. Rather, the magnetic profile emanating from the magnetized ink portions 324 will be dependent on the physical boundary (i.e. the size, shape, and area) of the printed ink portion 324 as all, or substantially all, of the printed ink portion 324 becomes magnetized by printing presses 109 and 300. The size and shape of the magnetic profile does not depend on the speed of the packaging material or base layer as it passes under the magnets on the static bar. Preferably the size of the magnet(s) 328 is larger than the size of the ink portions 324 to help ensure that all of the printed ink portion 324 becomes magnetized.

Figure 4:
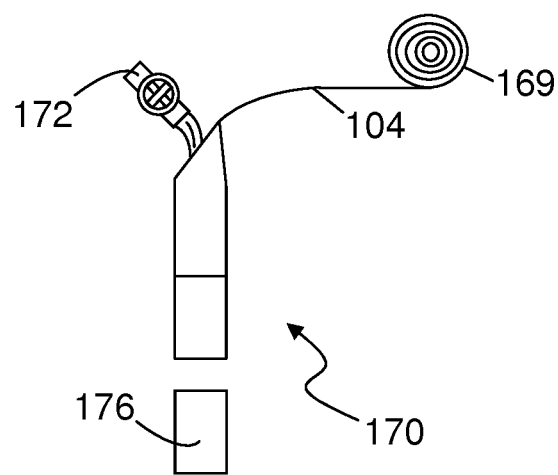
FIG. 4 depicts a filling machine for forming and filling a package from the packaging material produced according to an embodiment of the present invention.

As shown in FIG. 4, the packaging material 104 manufactured by the system in FIG. 1 is unwound from reel 169 and fed to the filling machine 170 wherein the packaging material is formed into a tube that is sealed at one end, filled with a food product from pipe 172, sealed again to enclose the food product, cut, and formed into a package 176. During filling a magnetic mark reader (not shown in FIG. 4) detects the magnetic field emanating from magnetized ink portion(s) 208 on the packaging material 104, 220 to synchronize the position of the packaging material 104 with the pipe 172 and other sealing and cutting elements (not shown). Any twist formed in the tube when making and filling the packages is also detectable. Such undesirable twist is then corrected to enhance operation and increase the yield of properly formed, filled, and sealed packages 176. Other operations (not shown) that may occur as part of filling machine 170 include sterilization of the packaging material, a positioning alignment with the magnetic mark (and the printed design) to correct any tube twisting, application of opening devices, a positioning alignment of said openings, customized creasing, embossing or printing on the outside of the finished packaging material, and/or cutting of the packaging material. The filling machine may also comprise a static bar (not shown) having at least one magnet for magnetizing the portions of ink applied to the packaging material.

The invention claimed is:

1. A device for magnetizing a packaging material for a pillow-type food-containing package, the device comprising:

an ink applicator configured to apply a plurality of portions of magnetizable ink to a packaging material, the packaging material having no crease lines and configured to form pillow-type food-containing packages;

a feeder configured to feed the packaging material through the device;

a static bar having at least one magnet, the static bar configured to magnetize the portions of ink applied to the packaging material, the at least one magnet comprising a surface area larger than the surface area of individual portions of magnetizable ink; and a printing press magnetizable ink applicator configured to apply the plurality of portions of magnetizable ink to the packaging material.

2. The device as claimed in claim 1, wherein the width of the rectangular-shaped portions is between about 2 mm to 6 mm.

3. The device as claimed in claim 2, wherein the width is between about 3 mm to 5 mm.

4. The device as claimed in claim 2, wherein the width is between about 3.9 mm to 4.1 mm.

5. The device as claimed in claim 1, wherein the static bar has at least two magnets.

6. The device as claimed in claim 1, wherein the magnet or magnets are configured such that in use the distance between the magnet or magnets and the packaging material is less than 5 mm.

7. The device as claimed in claim 6, wherein the distance between the magnet or magnets and the packaging material is less than 2 mm.

8. The device as claimed in claim 6, wherein the distance between the magnet or magnets and the packaging material is less than 1 mm.

9. The device as claimed in claim 1, wherein the device is configured to apply only one magnetized ink portion per a packaging container to be formed from the packaging material.

10. A system for producing a packaging material, the system comprising:

the device of claim 1 for magnetizing the packaging material; and at least one lamination station comprising an extruder and a roller press nip configured to provide a lamination layer configured to laminate the magnetized packaging material.

11. The system as claimed in claim 10, further comprising at least one operation unit configured to modify the magnetized and laminated packaging material, wherein the least one operation unit is selected from the group consisting of at least one of a doctoring unit and a printing unit for applying decorative artwork to the packaging material.

12. The system as claimed in claim 10, comprising at least two lamination stations, each lamination station comprising an extruder and a roller press nip configured to provide lamination layers configured to laminate the magnetized packaging material.

13. A method of magnetizing a packaging material for a food-containing package, the method comprising:

applying a plurality of rectangular portions of magnetizable ink to the packaging material, the packaging material having no crease lines and configured to form pillow-type food-containing packages; and moving the packaging material with the applied ink portions past a plurality of static magnets to magnetize the ink portions and form the magnetized packaging material, individual static magnets comprising a surface area larger than the surface area of individual portions of magnetizable.

14. The method as claimed in claim 13, wherein the packaging material is moved past a magnetizable ink applicator to apply the plurality of ink portions by flexography printing or ink jet printing.

15. The method as claimed in claim 13, wherein the packaging material with the applied ink portions is moved within 5 mm of the plurality of static magnets.

16. The method as claimed in claim 15, wherein the packaging material with the applied ink portions is moved within 2 mm of the plurality of static magnets.

17. The method as claimed in claim 15, wherein the packaging material with the applied ink portions is moved within 1 mm of the plurality of static magnets.

\* \* \* \* \*

UNITED STATES PATENT AND TRADEMARK OFFICE
CERTIFICATE OF CORRECTION

PATENT NO. : 11,679,581 B2
APPLICATION NO. : 16/322909
DATED : June 20, 2023
INVENTOR(S) : Torbjörn Rosenlöf It is certified that error appears in the above-identified patent and that said Letters Patent is hereby corrected as shown below:

In the Specification

Column 4, Line 36, after "to" insert -- 11 --.

Column 4, Line 61, delete "polytetrafluoro ethylene." and insert -- polytetrafluoroethylene. --.

In the Claims

Column 8, Line 24, Claim 13, delete "magnetizable." and insert -- magnetizable ink. --.

Signed and Sealed this
Twenty-sixth Day of September, 2023

Katherine Kelly Vidal
*Director of the United States Patent and Trademark Office*